United States Patent [19]
Redmond

[11] 4,197,919
[45] Apr. 15, 1980

[54] SEAT BELT SAFETY SYSTEM FOR MOTOR VEHICLES

[76] Inventor: Benjamin Redmond, 520 E. 77th St., New York, N.Y. 10021

[21] Appl. No.: 890,981

[22] Filed: Mar. 28, 1978

[51] Int. Cl.² ............................................. B60R 21/10
[52] U.S. Cl. .................................................. 180/269
[58] Field of Search .................. 180/82 C; 307/105 B; 200/61, 58 B; 340/52 E

[56] References Cited
U.S. PATENT DOCUMENTS

| | | | |
|---|---|---|---|
| 3,438,455 | 4/1969 | Redmond | 180/82 C |
| 3,729,059 | 4/1973 | Redmond | 180/82 C |
| 3,859,625 | 1/1975 | Eggert, Jr. | 180/82 C X |
| 3,977,488 | 8/1976 | Kameyama | 180/82 C X |

*Primary Examiner*—Robert R. Song
*Assistant Examiner*—Milton L. Smith
*Attorney, Agent, or Firm*—Berman, Aisenberg & Platt

[57] ABSTRACT

A seat belt safety system for motor vehicles wherein all seat belts of the vehicle are elements of a common electrical circuit operative to control the drive system of the vehicle, but independent from the operation of the vehicle's engine, wherein an unbuckled seat belt in any occupied seat of the vehicle will automatically prevent putting the vehicle in motion, except in reverse gear or the lowest forward gear.

6 Claims, 3 Drawing Figures

SEAT BELT SAFETY SYSTEM FOR MOTOR VEHICLES

BACKGROUND OF THE INVENTION

This invention relates generally to seat belt safety systems for automobiles and more particularly to seat belt safety systems of the type disclosed in my previous U.S. Pat. No. 3,438,455 and No. 3,729,059. In these earlier patents, a system was disclosed which permitted the vehicle's motor to be started when any of the driver's or passengers' seats were occupied with the seat belt buckles unfastened. However, until the buckles were fastened, the vehicle could not be moved because of a detent which engaged the gearshift lever and permitted it only to be shifted between the park and neutral positions. When the seat belts in all occupied seats were fastened, an electrical circuit was completed which activated a solenoid and withdrew the detent from the locking position, permitting the gearshift lever to be operated normally and the vehicle to be moved in any of its forward gears or in reverse.

While the above-described system obviated many objections which were voiced to the so called "ignition interlock system," by permitting the operator of the vehicle to start the engine before the seat belts were buckled, nevertheless, it was found that inconveniences still remained. For example, the vehicle could not be backed out of the driveway without first buckling the seat belts, nor could parking lot attendants deliver the vehicle to a customer, without first buckling the seat belts.

SUMMARY OF THE INVENTION

The principal object of the present invention is to overcome the above-stated disadvantages of the previously known "drive train interlock" systems by permitting the operator of the vehicle to shift into reverse or the lowest forward gear without the necessity of buckling any of the seat belts, so that the vehicle can be conveniently maneuvered for parking purposes, or the like, but nevertheless may not be driven at high speeds without first effecting the safety measure of seat belt buckling in all occupied seat positions.

In one embodiment of the present invention, the above-stated object is attained by providing a button which completes an electrical circuit for simultaneously removing the detent from its interlocked position with the gearshift lever and activating a second solenoid associated with a second detent which projects into the normal path of travel of the gearshift lever, preventing it from being shifted into any forward gear higher than the lowest such gear.

In a second embodiment of the invention, the detent engaging slot in the gearshift lever is lengthened so as to permit the gearshift lever to be shifted into park, neutral, reverse or lowest forward gear, but not into any of the higher forward gears.

BRIEF DESCRIPTION OF THE DRAWINGS

In the accompanying drawings which form part of the instant specification and which are to be read in conjunction therewith and in which like numbers refer to like parts throughout the views.

DESCRIPTION OF THE PREFERRED EMBODIMENTS

Figure 1:
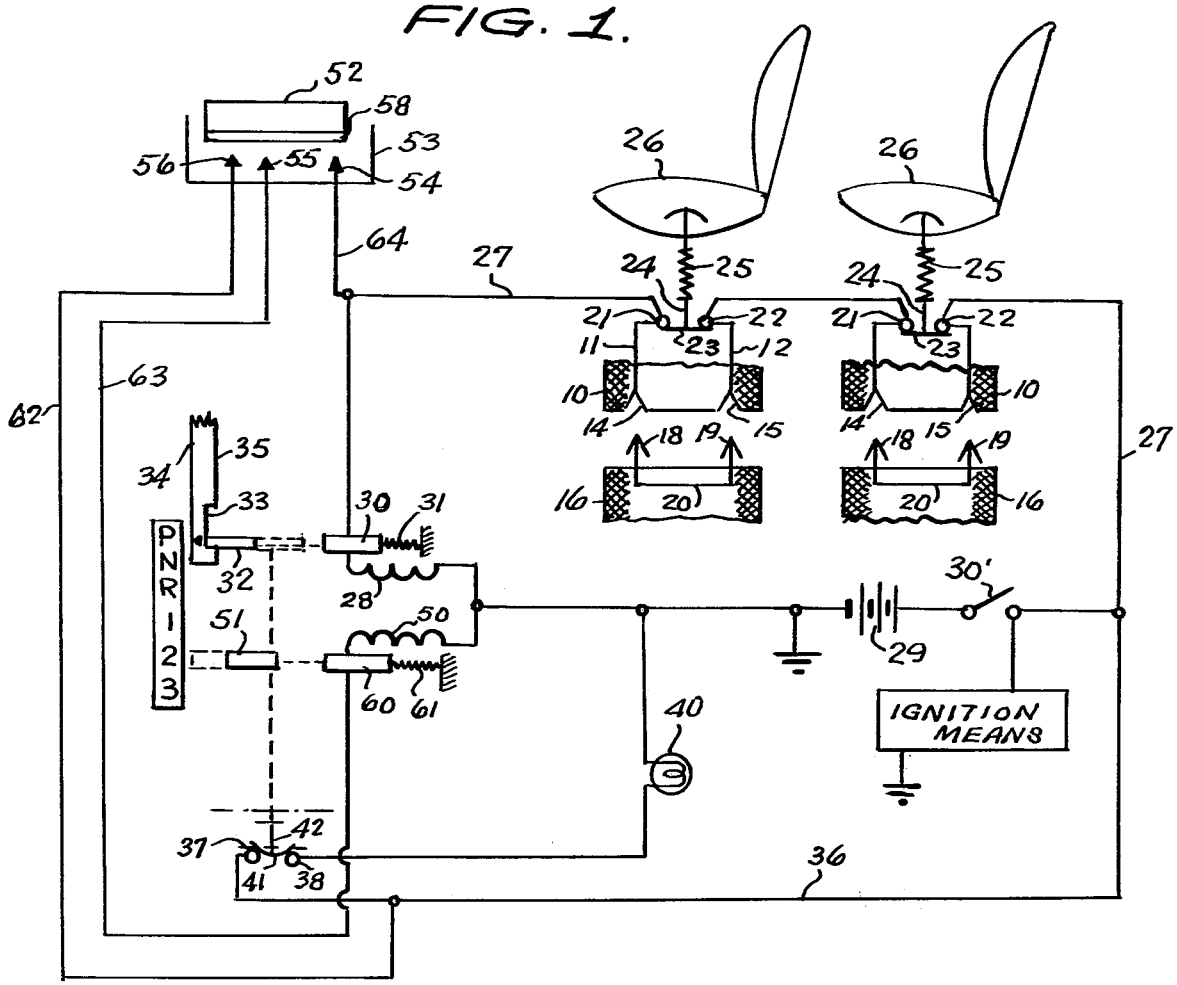
FIG. 1 is a schematic view of a first embodiment of the safety seat belt system in accordance with this invention.
Figure 2:
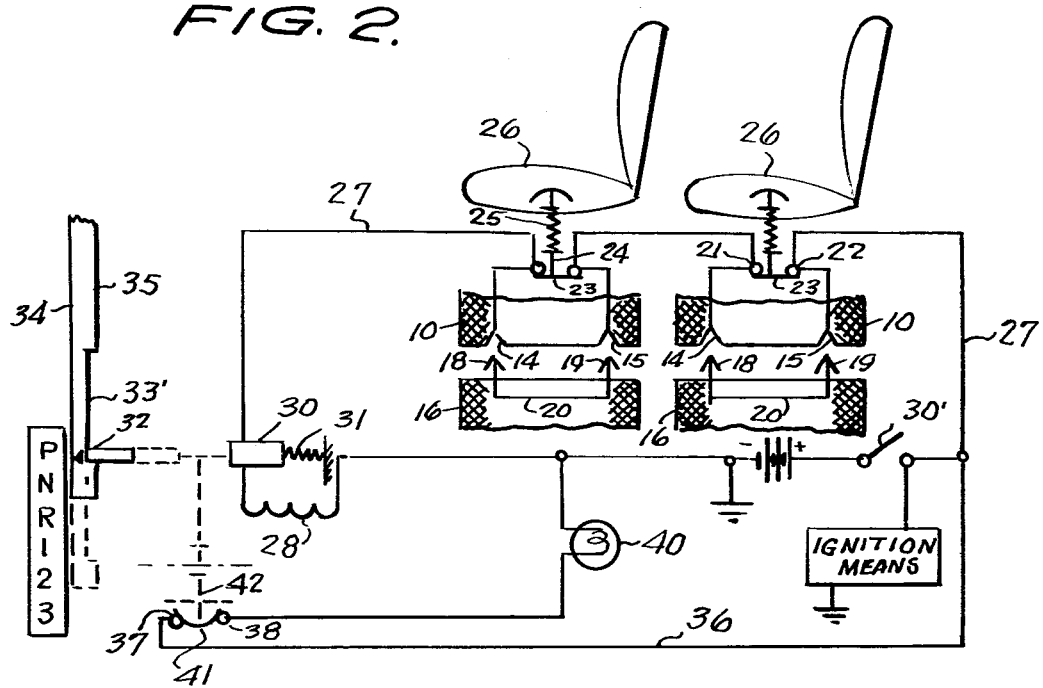
FIG. 2 is a schematic view of a second embodiment of a safety seat belt system in accordance with this invention.

Referring now to FIGS. 1 and 2 of the drawings, it will be seen that the basic system set forth therein is substantially similar to FIG. 1 of Redmond U.S. Pat. No. 3,438,455 mentioned above, and that FIG. 3 is identical to FIG. 2 of the aforementioned Redmond patent. The embodiment of FIG. 1 however differs from FIG. 1 of the previous Redmond patent by the inclusion of additional relay 50 and associated detent 51 and switch 53 with its associated circuitry. On the other hand, the embodiment of FIG. 2 differs from FIG. 1 of the aforementioned Redmond patent by the elongated groove 33', which replaces narrower groove 33 in the original Redmond patent. The purpose of these additions and modifications to the original Redmond system will become apparent from the detailed description and discussion set forth below.

Figure 3:
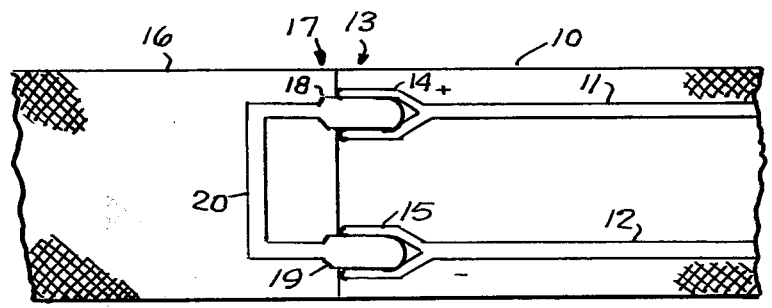
FIG. 3 is a fragmentary diagramatic view of a seat belt of the systems of either FIG. 1 or FIG. 2.

Referring now more particularly to FIG. 3 of the drawing, seat belt section 10 of woven fabric material is provided with a pair of metal electrical conductors 11 and 12 extending length-wise of the belt section and terminating at the free end 13 of the belt section in a pair of female electrical terminals 14 and 15, respectively. Likewise, the belt section 16, also of woven fabric material, is provided with a pair of male metal electrical terminals 18 and 19 which project outwardly from the free end 17 of the section for a distance sufficient for them to be slidably received and seat in the female terminals 14 and 15, respectively, of the belt section 10. A metal line 20 in the belt section 16 electrically connects the terminal fittings 18 and 19 within the belt section 16 so that a continuous electrical path is provided through the belt sections 10 and 16 when they are coupled as shown, via conductor 11, female terminal 14, male terminal 18, link 20, male terminal 19, female terminal 15 and conductor 12. It will be understood that the inner or free ends 13 and 17 of the belt sections 10 and 16, respectively, will be provided with suitable known male and female tongue and buckle elements (not shown) for separably connecting the belt sections in known manner and in usual fashion. It will be understood also that the outer ends of the belt sections 10 and 16 will be suitably secured in known manner to the vehicle in association with a seat of the vehicle. Two such seats are indicated in FIGS. 1 and 2, but it will be understood that a "seat" may be a driver's or a passenger's seat and as many individual "seats" are contemplated as the vehicle permits.

Turning now to FIGS. 1 and 2, it will be seen that the belt section 10 has its conductors 11 and 12 connected at the end remote from its free end 13 to switch terminals 21 and 22 which are normally connected together electrically by a displaceable switch element 23. The latter is carried at one end of an actuating plunger 24 whose other end is suitably operably connected to the internal spring structure 25 of a seat cushion 26 of the vehicle so that when the seat is occupied the plunger 24 will be displaced downwardly axially against the action of the seat spring structure, thereby causing the switch element 23 also to be displaced downwardly and thus break the circuit between the terminals 21 and 22. It will be observed however that if the belt sections 10 and 16 are connected as is the case when the belt is "buckled," the shunt electrical circuit through the belt formed by the series-connected conducting elements 11, 14, 18, 20, 19, 15 and 12, will maintain a conducting circuit between the terminals 21 and 22.

Each of the pairs of seat switch terminals 21 and 22 is connected in a series electrical circuit 27 which includes a solenoid 28, battery 29 and switch 30' for opening and closing the series circuit. Preferably, the battery 29 is the vehicle battery and the switch 30' the ignition switch or combination ignition-starter switch of the vehicle.

Referring now more specifically to FIG. 1, it will be seen that the solenoid plunger 30 is spring-pressed axially at one end by means of a spring 31 and carries a detent member 32 which is normally seated by means of the spring in a groove 33 in the gear selector lever 34 of the vehicle transmission. In these circumstances, the lever 34 may be moved between "park" and "neutral" position but not to a vehicle-operating position.

Assuming that the left-hand seat as viewed in FIG. 1 is occupied by the driver and that the right-hand seat in FIG. 1 is vacant, the weight of the driver in the occupied seat moves the switch element 22 associated with the driver's seat down out of contact with the associated terminals 21 and 22. If the drivers' seat belt is not buckled at this time, the conductors 11 and 12 in the driver's seat belt section 10 will not be connected through the line 20 in belt section 16 and an open circuit will exist across terminals 21 and 22 even though ignition switch 30' is "closed." Solenoid 28 will remain unenergized and, although the vehicle engine may be started and run, the vehicle cannot be moved. This may be overcome by the driver buckling his seat belt, thus closing the circuit between terminals 21 and 22 of the driver's seat and energizing solenoid 28. Energizing of solenoid 28 retracts the solenoid plunger 30 against the resistance of the spring 31 and effects withdrawal of the detent 32 from the groove 33 to the dash-dot position shown in FIG. 1. The selector lever 34 may now be moved to the desired operating position as, for example, to the position wherein the indicating arrow would be at 1. In this position, the detent 32 would be opposed by the flat face 35 of the selector lever and, were the solenoid 28 to become de-activated, as would be the case were the driver to unbuckle his seat belt, the detent 32 would merely be pressed against the face 35. Forward movement of the vehicle would not be affected unless and until the selector lever is moved back to the "park" or "neutral" position thus enabling the detent to seat itself in the groove 33.

Assuming however that both the driver's seat and a passenger's seat (the right-hand seat in FIG. 1) were occupied to begin with and that the selector lever 34 were in "park" or "neutral" position, the switch elements 23 associated with both the occupied driver's seat and the occupied passenger's seat would be displaced downwardly away from both sets of contacts 21 and 22. If either the driver's seat or the passenger's seat belt is not buckled under these circumstances an open circuit would exist across the set of contacts 21 and 22 of the driver's or passenger's seat as the case may be. Current would not flow in the solenoid circuit and the seated detent 32 would prevent movement of the selector lever 34 to an operating position until the unbuckled seat belt is buckled to close the solenoid circuit. Again, if this is done and the vehicle placed in motion, it may be continued in motion thereafter even if the driver or passenger or both unbuckles his seat belt since the detent 32 would merely be released and come to rest on the selector face 35.

The foregoing explanation corresponds with the description of FIG. 1 of original Redmond U.S. Pat. No. 3,438,455, mentioned above. It will be seen however that the present invention, as set forth in the embodiment of FIG. 1, includes switch 53, which may be of the push button type, having push button 52, including contact strip 58, of suitable conductive material and designed to make electrical contact with contact points 54, 55 and 56, when push button 52 is manually depressed. Switch 53 may be of the type such as that commonly used for blinker lights in automobiles and may be conveniently mounted on the steering column for ready accessibility to the driver.

Solenoid 50 is provided which has associated therewith solenoid plunger 60, which is spring pressed axially at one end by means of spring 61 and which carries a detent member 51 which is normally retracted as shown in FIG. 1.

Contact 56 is connected to the positive side of battery 29 through ignition switch 30', when it is closed, and lead 62. Contact point 55 is connected to the positive side of solenoid 50 via lead 63; and contact point 54 is connected to the positive side of solenoid 28 via lead 64.

The above-described modifications to the circuit of the original Redmond U.S. Pat. No. 3,438,455 are all for the purpose of effecting the object of the present invention which is to eliminate the disadvantages of the prior system by permitting the driver to move the vehicle in either reverse or lowest forward gear, even though the seat belts in any of the occupied positions, may be unbuckled. As explained above, such capability of the vehicle for movement is desirable in parking lots, driveways or the like, or in general, when it is desired to move the vehicle for only short distances. In addition to its efficacy as a safety device, by inducing the buckling of seat belts when movement at higher speeds is desired, the present invention may also be looked upon as a speed regulator and fuel saving device. In this sense, if it is desired to move the vehicle only short distances, for example several blocks, rather than buckling the seat belt, it may be thought desirable to maintain the car in the lowest forward gear, resulting in lower speeds and attendant savings of fuel.

In operation, it can be seen that when push button 52 is depressed, contact strip 58 completes the circuit between battery 29 and the positive side of solenoids 28 and 50, regardless of whether or not the circuit between any set of contacts 21 and 22 is open, representing an unbuckled seat belt. The application of battery voltage to solenoids 28 and 50 causes two things to happen simultaneously. Detent member 32 is retracted, while detent member 51 is extended into the path of gear selector lever 34. These two simultaneous actions will permit gearshift lever 34 to be shifted into reverse or first gear, but into no higher forward gears due to the impediment or limiting means created by detent 51. Preferably, solenoid 50 should have associated with it, a time-delay circuit, such that after detent 51 is extended, it will remain in this position for a predetermined amount of time, so that the driver of the vehicle cannot defeat the safety aspects of the system, by quickly depressing and then releasing push button 52. Such time-delay circuits are well known and need not be described in detail herein.

Turning now to FIG. 2, it will be seen that the only difference between the circuit set forth therein and the original Redmond circuit set forth in FIG. 1 of U.S. Pat. No. 3,438,455 is the widened groove 33'. This widened groove is dimensioned so as to permit the movement of gearshift lever 34 into the reverse and lowest forward gear positions, as shown by the dashed line position in FIG. 2. Such movement will be permissible regardless of whether the seat belts are fastened in any of the occupied seat positions. When, however, it is desired to operate the vehicle in a higher forward gear, the seat belts must be fastened so as to retract detent 32 and permit the shifting of gearshift lever 34 into the higher forward gears.

In either of the embodiments of FIG. 1 or FIG. 2, means are preferably provided for giving a visual indication that a seat belt in an occupied seat, is unbuckled. As here preferably embodied, an alarm circuit 36 is provided in parallel with the seat belt circuit 27 and includes a pair of switch-operated terminals 37 and 38 in series with the battery 29, the ignition switch 30' and with a signal light 40.

A reciprocable flexible switch member 41 having an axially movable actuating arm 42 secured thereto is mounted to the solenoid plunger 30 so as to be movable out of and into engagement with the terminals 37 and 38. The switching member 41 is preferably an elongated, thin resilient metal strip of electrically conductive material such, for example, as copper. Normally, this member is held in firm engagement with the terminals 37 and 38 by the solenoid plunger 30 under the action of the solenoid spring 31. In its engaged position and by reason of its flexibility it is deformed from its normal planar configuration and assumes an arcuate shape, as depicted by the solid line position thereof in FIGS. 1 and 2. When fully retracted by the plunger 30 to the dot-dash line position it is restored to its normal planar configuration and is wholly separated from the terminals 37 and 38 and the alarm circuit 36 is open. In an intermediate position indicated by the dash lines in FIG. 1, it merely rests upon the terminals 37 and 38 with sufficient pressure to maintain the circuit closed between these terminals.

As has been noted above, when the vehicle is in motion and the belt circuit 27 is broken by the unbuckling of a belt in an occupied seat, the detent 32 is urged by the spring-pressed plunger 30 against the face 35 of the selector lever 34. This position of the plunger 30 corresponds to the above-noted intermediate position (dash line position) of the switch member 42. In this position the alarm circuit is closed and an unbuckled seat belt will be indicated automatically to the driver by the signal light 40.

It will be apparent to those skilled in the art that depending upon the type of vehicle with which the subject invention is employed, it may be necessary to rearrange the positions of the various gears in their order on the gearshift lever indicator. In addition, it will be apparent to those skilled in the art that various changes and modifications may be made to the subject invention without departing from the intent and spirit thereof. Accordingly, it is intended that the scope of my invention be defined solely by the claims appended hereinbelow.

I claim as my invention:

1. A safety seat belt system for use with a motor vehicle having an engine ignition system, drive train means including control means therefor shiftable between an engine starting position and at least one drive position, for transmitting power from the vehicle engine to the vehicle drive wheels, safety seat belt means for releasably securing the operator to the driver's seat of the vehicle and at least one other safety seat belt means for releasably securing a passenger to a passenger's seat of the vehicle, said safety seat belt means each including a pair of separable seat belt sections, the sections of each pair being adapted to be releasably connected together and providing an electrical circuit through at least one section of the pair when connected; means normally locking said control means in the engine starting position; switch means associated with the driver's seat and other switch means associated with said passenger seat, each said switch means being responsive to the weight of the seat occupant so as to be closed when the associated seat is unoccupied and open when the associated seat is occupied; normally de-energized first solenoid means in electrical circuit with the engine ignition system, with each of said switch means and with the electrical circuits of said seat belt sections, said solenoid means being only operable in response to the connection of all of the seat belt sections of all of the occupied seats for releasing said locking means when the seat belt sections of all of the occupied seats are connected, whereby said control means may be shifted from an engine starting position to a drive position; the improvement comprising:

means controllable by the driver of said vehicle for energizing said first solenoid means and for operating means limiting the movement of the control means so as to permit the movement of said control means only between said engine starting position, reverse gear and lowest forward gear, even though any of said seat belt means may be open at any occupied seat.

2. The safety seat belt system set forth in claim 1, wherein said means controlled by the driver comprises switch means for applying battery voltage to said first solenoid means.

3. The safety seat belt system set forth in claim 2, wherein said control means comprises a transmission gear selector and further including second solenoid means for operating said limiting means for preventing the shifting of said transmission gear selector into any higher forward gear than the lowest forward gear.

4. The safety seat belt system set forth in claim 3, wherein said second solenoid means is controlled by said driver actuated switch means and is energized simultaneously with the energization of said first solenoid means.

5. The safety seat belt system set forth in claim 4, wherein said transmission gear selector is provided with a slot, said locking means comprises detent means engagable with said slot and controlled by said first solenoid means; and wherein said limiting means is a second detent means associated with said second solenoid means for preventing the shifting of said transmission gear selector beyond the lowest forward gear, when said first detent means is disengaged from said slot by energization of said first solenoid means.

6. The safety seat belt system set forth in claim 5, wherein said second detent means is forced into the normal path of travel of said gear selector means by energization of said second solenoid means simultaneously with the withdrawal of said first detent means from said slot upon energization of said first solenoid means.

* * * * *